(12) United States Patent
Nakamura et al.

(10) Patent No.: US 8,824,600 B2
(45) Date of Patent: Sep. 2, 2014

(54) MULTIUSER MIMO SYSTEM, RECEIVER, AND TRANSMITTER

(75) Inventors: Osamu Nakamura, Osaka (JP); Shuuji Urabe, Osaka (JP); Yasuhiro Hamaguchi, Osaka (JP); Kazunari Yokomakura, Osaka (JP); Jungo Goto, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 494 days.

(21) Appl. No.: 13/126,697

(22) PCT Filed: Oct. 20, 2009

(86) PCT No.: PCT/JP2009/068073
§ 371 (c)(1),
(2), (4) Date: Jul. 6, 2011

(87) PCT Pub. No.: WO2010/050384
PCT Pub. Date: May 6, 2010

(65) Prior Publication Data
US 2011/0255624 A1   Oct. 20, 2011

(30) Foreign Application Priority Data
Oct. 29, 2008 (JP) .................... 2008-278544

(51) Int. Cl.
*H04L 27/06* (2006.01)
(52) U.S. Cl.
USPC ........... 375/340; 375/260; 375/267; 375/296; 370/329; 370/344; 455/450
(58) Field of Classification Search
CPC . H04L 27/2636; H04L 5/0019; H04L 5/0021; H04L 5/0023; H04L 5/0007; H04L 27/26; H04L 27/32; H04L 5/0037; H04L 5/0039; H04B 1/707; H04B 7/0452

USPC .............. 375/144, 148, 340, 260, 267, 296
See application file for complete search history.

(56) References Cited

U.S. PATENT DOCUMENTS 7,356,343 B2 * 4/2008 Feher .................. 455/456.1
(Continued)

FOREIGN PATENT DOCUMENTS

| CN | 1829102 A | 9/2006 |
| JP | 2007-151059 A | 6/2007 |

OTHER PUBLICATIONS

R1-081791 Technical proposals and considerations for LTE advanced, May 5-9, 2008, 3GPP TSG RAN WG1 #53, pp. 1-16.*
Xiangning et al. "Analysis and Comparison of Different SC-FDMA Schemes for 3GPP", Sep. 2007, IEEE, pp. 787-790.*
International Search Report dated Nov. 24, 2009 for International Application No. PCT/JP2009/068073.

(Continued)

*Primary Examiner* — Sophia Vlahos
(74) *Attorney, Agent, or Firm* — Birch, Stewart, Kolasch & Birch, LLP (57) ABSTRACT

Even when respective transmitters use different transmission schemes, signals of the respective transmitters are separated. A receiver that is applied to a multiuser MIMO system in which a plurality of transmitters performs transmission to at least one receiver, includes a MIMO separation part 40 that receives signals transmitted in different transmission schemes at the same time and at the same frequency and separates the received signals for each transmitter, a switching part 41 that switches output destinations according to the transmission scheme of the separated signal, and a single-carrier processing part 42 and a multi-carrier processing part 43 provided for each transmission scheme for processing a signal output from the switching part 41 according to its transmission scheme.

11 Claims, 9 Drawing Sheets

(56) References Cited

U.S. PATENT DOCUMENTS

| | | | |
|---|---|---|---|
| 8,457,265 B2* | 6/2013 | Sampath | 375/350 |
| 8,509,053 B2* | 8/2013 | Noh et al. | 370/208 |
| 2004/0029579 A1* | 2/2004 | Kashiwase | 455/424 |
| 2006/0109931 A1 | 5/2006 | Asai et al. | |
| 2008/0032630 A1* | 2/2008 | Kim et al. | 455/45 |
| 2008/0096574 A1* | 4/2008 | Khandekar et al. | 455/452.2 |
| 2008/0304584 A1* | 12/2008 | Nishio et al. | 375/260 |
| 2009/0147748 A1 | 6/2009 | Ofuji et al. | |
| 2009/0180459 A1* | 7/2009 | Orlik et al. | 370/344 |
| 2010/0091919 A1* | 4/2010 | Xu et al. | 375/346 |
| 2011/0110323 A1* | 5/2011 | Kim et al. | 370/329 |

OTHER PUBLICATIONS

Nortel, "UL Virtual MIMO Transmission for E-UTRA", 3GPP TSG-RAN1 Meeting #42bis, R1-0501162, Oct. 10, 2005.

NTT DoCoMo, "Proposals for LTE-Advanced Technologies", 3GPP TSG RAN WG1 Meeting #53bis, R1-082575, Jun. 30, 2008.

NTT Docomo, "Views on UL Hybrid Radio Access Scheme in LTE-Advanced", 3GPP TSG RAN WG1 Meeting #54bis, R1-083682, Sep. 29, 2008.

Takahiro Chiba, Kazuaki Takeda and Fumiyuki Adachi, "Uplink Capacity of a Cellular System Using Single-Carrier Multi-User MIMO," IEICE Tech. Rep., vol. 107, No. 402, RCS207-133, pp. 127-132, Dec. 2007.

* cited by examiner

MULTIUSER MIMO SYSTEM, RECEIVER, AND TRANSMITTER

TECHNICAL FIELD

The present invention relates to a multiuser MIMO system in which a plurality of transmitters performs transmission to at least one receiver, and relates to a receiver and a transmitter used in the system.

BACKGROUND ART

In the next generation mobile communication, a high-speed data transmission is demanded. In order to perform a high-speed data transmission, a wide frequency band is necessary. However, in a radio communication channel, frequency selective fading including a number of delayed waves (multi-paths) occurs. When performing a wideband single-carrier transmission in such a communication environment, the sampling intervals of received signals become shorter, and therefore, the delayed wave in the channel causes inter-symbol interference, resulting in considerable deterioration in the transmission performances. There is a technique to suppress the inter-symbol interference by time domain signal processing, however, there is such a problem that the circuit scale of a receiver becomes very large.

Hence, a multi-carrier transmission attracts attention, such as orthogonal frequency division multiplexing (OFDM) in which a large amount of data is transmitted in parallel in a frequency domain using a number of narrowband subcarriers arranged at orthogonal frequency intervals and multi-carrier code division multiple access (MC-CDMA).

In the multi-carrier transmission, the periodicity of the OFDM symbol can be maintained by adding a waveform at the rear of an OFDM symbol interval to the front as a guard interval (GI). Hence, it is possible to perform signal processing that does not depend on the number of paths while each subcarrier maintains orthogonality between subcarriers without being affected by the multi-path even in the frequency selective fading environment. Hence, in LTE (Long Term Evolution) that is conformal with the standard of 3GPP (3rd Generation Partnership Project), OFDM is employed in a downlink (transmission from a base station to a mobile terminal). Further, OFDM is also used in terrestrial digital broadcasting, wireless LAN (Local Area Network), etc.

On the other hand, in an uplink (transmission from a mobile terminal to a base station) in mobile communication, it is difficult to use the OFDM transmission with a high PAPR (Peak to Average Power Ratio) because of the problem of nonlinearity of a transmit power amplifier of a mobile terminal and it is desired to use a single-carrier transmission. Thus, in the uplink of LTE, a single-carrier transmission called SC-FDMA (Single Carrier Frequency Division Multiple Access (also called DFT-S-OFDM)) is employed. In SC-FDMA, it is possible to achieve excellent transmission performances with a frequency diversity effect obtained while suppressing inter-symbol interference by adding GI to a single-carrier transmission and using equalization to compensate for the distortion of a signal by one-time multiplication in the frequency domain (frequency domain equalization) based on the same concept as that of OFDM. As described above, in the present situation of the recent mobile communication, different transmission schemes are employed in the uplink and downlink.

However, in the single-carrier transmission using frequency domain equalization, the inter-symbol interference cannot be suppressed completely, and therefore, there is such a problem that the transmission performances are somewhat deteriorated compared to those in the multi-carrier transmission (for example, OFDM). Further, in the single-carrier transmission, adaptive modulation on the frequency domain cannot be performed, and therefore, the throughput (spectral efficiency) is lowered compared to the multi-carrier transmission.

Because of such a problem, Patent Document 1 proposes the transmitter, receiver, mobile communication system, and transmission control method capable of switching between the single-carrier type radio access system and the multi-carrier type radio access system. In Patent Document 1, a switching part to switch the transmission schemes is provided in the transmitter. The switching part selects the single-carrier transmission when the required transmit power is high and the multi-carrier transmission with a high PAPR cannot be performed. On the other hand, the transmitter which has the low transmit power and for which PAPR is not problematic selects the multi-carrier transmission. This can improve the throughput of the entire cell.

As described above, it has also been proposed to cause mobile terminals that use different transmission schemes to exist in the uplink as well as using different transmission schemes in the uplink and downlink and the proposal is now actively discussed in 3GPP (Non-patent Document 1).

Patent Document 1: Japanese Unexamined Patent Publication No. 2007-151059
Non-patent Document 1: R1-082575, NTT DoCoMo

DISCLOSURE OF THE INVENTION

In Patent Document 1, the single-carrier user and the multi-carrier user are time-division-multiplexed or frequency-division-multiplexed. However, in order to further realize higher speed data transmission in the entire system, it is preferable to improve throughput by applying the multiuser MIMO (Multiple Input Multiple Output) in which a plurality of users transmits at the same time and at the same frequency and the base station separates the signal of each user. On the other hand, conventionally, there is not such a system in which different transmission schemes are employed in the uplink, and therefore, it has been discussed that all the users perform the single-carrier (or multi-carrier) transmission in the multiuser MIMO.

However, the concept of the multiuser MIMO in the environment, in which each user uses different transmission schemes at the same time and at the same frequency, that is, the single-carrier and the multi-carrier exist mixedly, does not exist conventionally as a system. That is, conventionally, in a band in which a certain user performs the single-carrier transmission, it is required for another user to perform the single-carrier transmission even in the environment in which the user could perform the multi-carrier transmission. On the other hand, in a band in which a certain user already performs the multi-carrier transmission, although it is required for another user to perform the multi-carrier transmission, however if the environment does not allow the multi-carrier transmission to be performed, the user has nothing to do but give up the communication itself in that band.

The present invention has been made in view of such circumstances and has an object to provide a multiuser MIMO system, a receiver, and a transmitter in which signals of each transmitter can be separated even when each transmitter uses different transmission schemes.

(1) In order to achieve the above-mentioned object, the present invention took measures as described below. That is, the multiuser MIMO system of the present invention is a multiuser MIMO system in which a plurality of transmitters performs transmission to at least one receiver, characterized by including a plurality of transmitters for performing radio transmission in different transmission schemes and at least one receiver for receiving a signal radio-transmitted from each of the transmitters and separating the received signal for each of the transmitters to obtain data.

As described above, a plurality of transmitters performs radio transmission in different transmission schemes and at least one receiver receives a signal radio-transmitted from each transmitter and acquires data by separating the received signal for each transmitter, and therefore, it is possible to provide a radio communication system in which a receiver can separate a signal even in an environment in which transmitters that perform radio transmission in different transmission schemes exist mixedly. Hence, it is possible for each transmitter to determine a transmission scheme regardless of the transmission scheme of another transmitter. As a result, it is made possible to improve the cell throughput.

(2) Further, the multiuser MIMO system of the present invention is characterized in that the transmitter performs multiplexing only in partial frequency band in the system band and the receiver performs demultiplexing of a signal multiplexed only in the partial frequency band in the system band.

As described above, the transmitter performs multiplexing only in the partial frequency band in the system band, and therefore, it is made possible to perform more flexible frequency scheduling. Further, in a frequency band in which the band used by a plurality of transmitters is not multiplexed or in a frequency band in which the number of multiplexed signals is smaller than the number of receive antennas, the receive antenna diversity effect can be obtained, and therefore, it is made possible to make an attempt to improve the transmission performances.

(3) The receiver of the present invention is a receiver applied to a multiuser MIMO system in which a plurality of transmitters performs transmission to at least one receiver, and the receiver is characterized by including a reception part for receiving signals transmitted in different transmission schemes at the same time and at the same frequency; a MIMO separation part for separating the received signal for each of the transmitters; a switching part for switching output destinations according to the transmission scheme of the separated signal; and a signal processing part provided for each transmission scheme, for processing a signal output from the switching part according to its transmission scheme.

As described above, the signals transmitted at the same time and at the same frequency in different transmission schemes are separated for each transmitter, the output destinations are switched according to the transmission scheme of the separated signal, and the processing according to the transmission scheme is performed, and therefore, it is possible to provide a radio communication system in which a receiver can separate a signal even in an environment in which transmitters that perform radio transmission in different transmission schemes exist mixedly. Hence, it is possible for each transmitter to determine a transmission scheme regardless of the transmission scheme of another transmitter. As a result, it is made possible to improve the cell throughput.

(4) Further, the receiver of the present invention is characterized in that the MIMO separation part separates signals using an MMSE (Minimum Mean Square Error) weight.

As described above, the MMSE weight is used, and therefore, it is made possible to separate a signal regardless of the transmission scheme of each transmitter.

(5) Further, the receiver of the present invention is characterized in that the MIMO separation part demultiplexes a signal multiplexed only in partial frequency band in the system band using the MMSE weight.

As described above, the receiver demultiplexes a signal multiplexed only in the partial frequency band in the system band using the MMSE weight, and therefore, it is possible for the transmitter to perform multiplexing only in the partial frequency band in the system band and it is made possible to perform more flexible frequency scheduling. Further, in a frequency band in which the band used by a plurality of transmitters is not multiplexed or in a frequency band in which the number of multiplexed signals is smaller than the number of receive antennas, the receive antenna diversity effect can be obtained, and therefore, it is made possible to make an attempt to improve the transmission performances.

(6) The transmitter of the present invention is a transmitter applied to a multiuser MIMO system in which a plurality of transmitters performs transmission to at least one receiver, and the transmitter is characterized by transmitting a radio signal to the receiver according to above at the same time and at the same frequency as those of another transmitter in a transmission scheme different from that of the another transmitter.

As described above, the transmitter transmits a radio signal to the receiver according to above at the same time and at the same frequency as those of another transmitter in a transmission scheme different from that of the another transmitter, and therefore, it is possible to provide a radio communication system in which a receiver can separate a signal even in an environment in which transmitters that perform radio transmission in different transmission schemes exist mixedly.

According to the present invention, a plurality of transmitters performs radio transmission in different transmission schemes and at least one receiver receives a signal radio-transmitted from each transmitter and acquires data by separating the received signal for each transmitter, and therefore, it is possible to provide a radio communication system in which a receiver can separate a signal even in an environment in which transmitters that perform radio transmission in different transmission schemes exist mixedly. Hence, it is possible for each transmitter to determine a transmission scheme regardless of the transmission scheme of another transmitter. As a result, it is made possible to improve the cell throughput.

10 error correction encoding part
11 interleaving part
12 modulation part
13 GI addition part
14 frame configuration part
15 reference signal generation part
16 radio transmission part
17 antenna part
20 IFFT part
30-1 to 30-Nr antenna part
31-1 to 31-Nr radio reception part
32-1 to 32-Nr reference signal separation part
33-1 to 33-Nr GI removal part
34-1 to 34-Nr FFT part
35 signal processing part
36 channel estimation part
40 MIMO separation part
41 switching part
42 single-carrier processing part
43 multi-carrier processing part
50 IFFT part
51 demodulation part
52 deinterleaving part
53 error correction decoding part
60 P/S conversion part
70 weight generation part
71 weight multiplication part
90 DFT part
91 spectrum mapping part
92 IFFT part
100 P/S conversion part
120 MIMO separation part
121 zero replacing part
122 transmission spectrum information part
123 weight generation part
124 weight multiplication part
125 spectrum demapping part

BEST MODES FOR CARRYING OUT THE INVENTION

First Embodiment

Next, embodiments according to the present invention will be described with reference to the drawings. In a first embodiment, an environment is supposed, in which each transmitter performs single-carrier transmission or multi-carrier transmission, and therefore, signals received by a receiver include single-carriers and multi-carriers mixedly in a multiuser MIMO system in which a plurality of transmitters accesses a base station at the same time and at the same frequency. The present invention realizes a communication system in which a signal of each user can be demultiplexed even in the environment described above.

Figure 1:
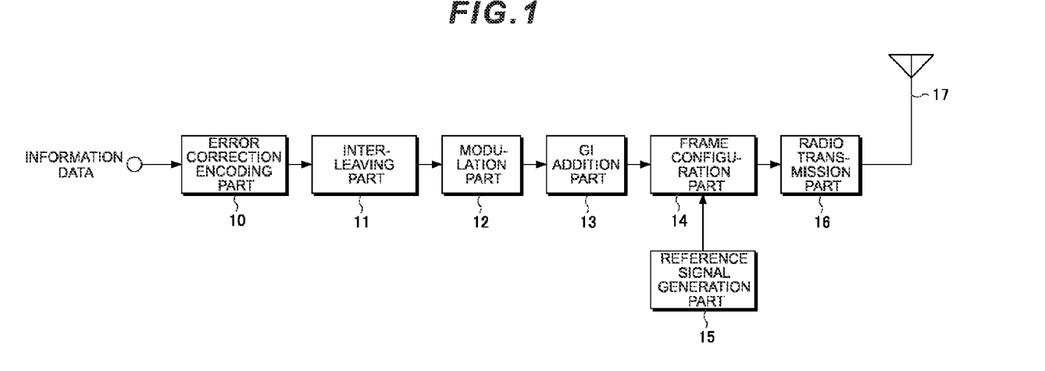
FIG. 1 is a diagram showing a schematic configuration of a transmitter that performs single-carrier transmission.

FIG. 1 is a diagram showing a schematic configuration of a transmitter that performs single-carrier transmission. The single-carrier transmission includes various types, however, in this specification, the single-carrier transmission is defined as a transmission scheme in which a single is generated in a time domain and the multi-carrier transmission as a transmission scheme in which a signal is generated in a frequency domain. Consequently, in the first embodiment, a pure single-carrier transmission is explained as an example of a single-carrier transmission, however, the first embodiment can also be applied to other single-carrier based transmission methods, such as DS-CDMA (Direct Sequence Code Division Multiple Access), DFT-S-OFDM (Discrete Fourier Transform Spread OFDM, also called SC-FDMA) employed in the uplink in LTE (Long Term Evolution) of 3GPP (3rd Generation Partnership Project), and Clustered DFT-S-OFDM being discussed in LTE-A (LTE Advanced).

In FIG. 1, information data, that is a data bit sequence, is input to an error correction encoding part 10. The error correction encoding part 10 performs error correction encoding on the input data bit sequence, such as convolution code, turbo code, and LDPC (Low Density Parity Check) code, and outputs the coded bit sequence obtained to an interleaving part 11. The interleaving part 11 interleaves the order to randomize the influence on the channel and outputs it to a modulation part 12. The modulating part 12 generates $N_{FFT}$ modulation symbols, such as QPSK (Quaternary Phase Shift Keying) and 16QAM (Quadrature Amplitude Modulation) and outputs them to a GI addition part 13. The GI addition part 13 performs processing to add rear $N_{GI}$ symbols of the signal of the $N_{FFT}$ symbols to the front of the input signal and outputs a signal sequence of the $N_{FFT}+N_{GI}$ symbols. A data signal s(t) output from the GI addition part 13 at time t is input to a frame configuration part 14 where a frame is configured by multiplexing the data signal s(t) and a reference signal generated by a reference signal generation part 15 and the frame is output to a radio transmission part 16. The radio transmission part 16 performs processing on an input digital signal, such as D/A (Digital to Analog) conversion, up-conversion, and band pass filtering, and then transmits the signal from an antenna part 17.

Next, a configuration of a transmitter that performs OFDM transmission is explained. In the present embodiment, OFDM is explained as an example of multi-carrier transmission, however, the present embodiment can also be applied to other multi-carrier based transmission methods, such as MC-CDMA and VSF-OFCDM (Variable Spreading Factor Orthogonal Frequency and Code Division Multiplexing).

Figure 2:
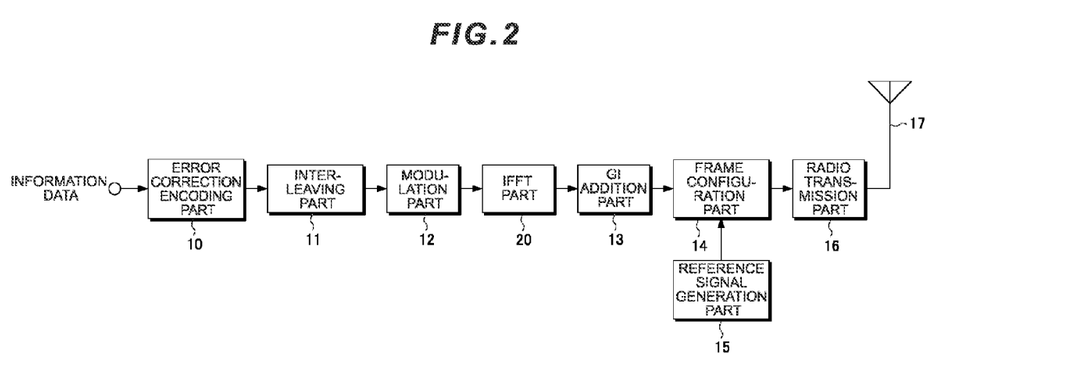
FIG. 2 is a diagram showing a schematic configuration of a transmitter that performs OFDM transmission.

FIG. 2 is a diagram showing a schematic configuration of a transmitter that performs OFDM transmission. The configuration of an OFDM transmitter is configured by inserting an IFFT (Inverse Fast Fourier Transform) part 20 between the modulation part 12 and the GI addition part 13 in the configuration of the single-carrier transmitter shown in FIG. 1 and other configurations are the same. The IFFT part 20 performs processing to convert a modulation symbol into a time domain.

In the first embodiment, the example is explained, in which each transmitter includes one transmit antenna and transmits a transmission signal in one line, however, it may also be possible for one transmitter to include a plurality of antennas and transmit a plurality of transmission signals using a plurality of lines.

Here, when a mobile terminal includes both a multi-carrier transmitter and a single-carrier transmitter, the transmission scheme is generally determined by the location of the mobile terminal. For example, when the mobile terminal is located near the base station and the required transmit power of the mobile terminal is low, it is possible to improve the spectral efficiency more by using the multi-carrier transmission. On the other hand, for example, when the mobile terminal is located distant from the base station and the required transmit power of the mobile terminal is low, it is made possible to establish communication by performing the single-carrier transmission with a high PAPR.

Figure 3:
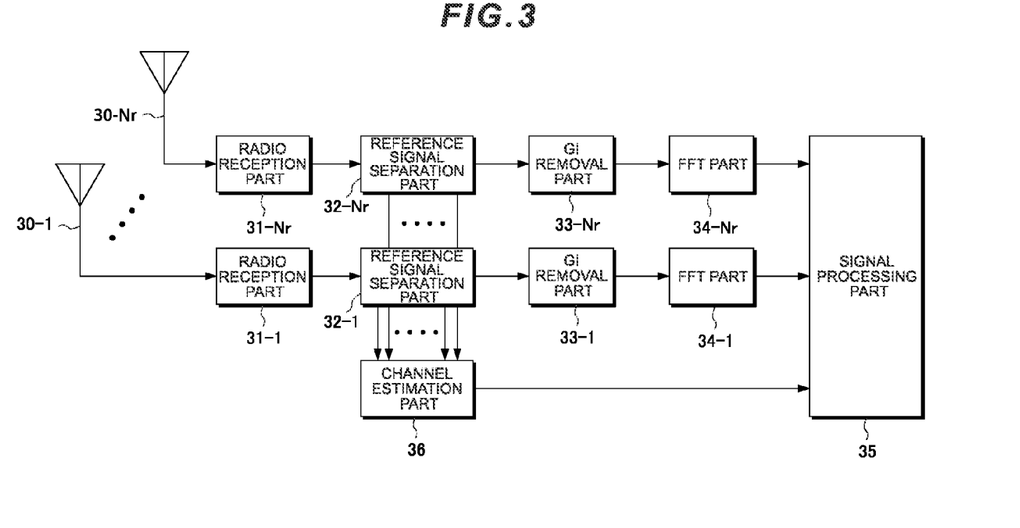
FIG. 3 is a diagram showing a schematic configuration of a receiver having $N_r$ receive antennas in a base station.

A signal transmitted from each transmitter is received by the antenna part of a receiver of the base station via a channel. FIG. 3 is a diagram showing a schematic configuration of a receiver having $N_r$ receive antennas in the base station. If the number of transmitters that perform transmission is assumed to be U, a received signal r(t) ($N_r \times 1$ vector) at the time t is expressed by the following formula.

[Mathematical formula 1]

$$r(t) = \sum_{l=0}^{L-1} h_l s(t - \tau_l) + \eta(t) \quad (1)$$

Here,

[Mathematical formula 2]

$$\begin{cases} s(t) = [\, s_0(t) \quad s_1(t) \quad \ldots \quad s_{U-1}(t) \,]^T \\ h_l = \begin{bmatrix} h_{0,0,l} & h_{0,1,l} & \ldots & h_{0,U-1,l} \\ h_{1,0,l} & h_{1,1,l} & \ldots & h_{1,U-1,l} \\ \vdots & \vdots & \ddots & \vdots \\ h_{N_r-1,0,l} & h_{N_r-1,1,l} & \ldots & h_{N_r-1,U-1,l} \end{bmatrix} \\ \eta(t) = [\, \eta_0(t) \quad \eta_1(t) \quad \ldots \quad \eta_{N_r-1}(t) \,]^T \end{cases} \quad (2)$$

where $h_{n,u,l}$ and $\tau_l$ are a complex channel gain between u-th transmitter and n-th receive antenna, and a delayed time in l-th path, respectively, $S_u$ (t) is a transmission signal of the u-th transmitter at the time t, and $\eta_n$ (t) is a thermal noise in the n-th receive antenna.

The signal r (t) received by antenna parts 30-1 to 30-Nr is input to radio reception parts 31-1 to 31-Nr. In the radio reception parts 31-1 to 31-Nr, down-conversion, filtering processing, and A/D (Analog to Digital) conversion are performed and then the signal is input to reference signal separation parts 32-1 to 32-Nr. The reference signal separation parts 32-1 to 32-Nr perform separation between the reference signal and data signal.

The reference signal is input to a channel estimation part 36 and the data signal is input to GI removal parts 33-1 to 33-Nr. In the GI removal parts 33-1 to 33-Nr, GI of the $N_{GI}$ symbols added in the transmitter is removed from the data signal of the $N_{FFT}+N_{GI}$ symbols and the data signal is output to FFT parts 34-1 to 34-Nr. In the FFT parts 34-1 to 34-Nr, FFT is applied to the input signal to convert the signal into a frequency domain signal. This processing is performed for each of the antenna parts 30-1 to 30-Nr independently.

A frequency domain received signal vector R (k) ($N_r \times 1$ vector) in a k-th subcarrier obtained by applying FFT to the time domain received signal expressed by formula (3), which is the output of the FFT parts 34-1 to 34-Nr, is expressed by the following formula.

[Mathematical formula 3]

$$R(k) = \sum_{t=0}^{N_{FFT}-1} r(t) \exp(-j 2\pi k t / N_{FFT}) \quad (3)$$

$$= H(k)S(k) + \Pi(k)$$

Here,

[Mathematical formula 4]

$$\begin{cases} S(k) = [\, S_0(k) \quad S_1(k) \quad \ldots \quad S_{U-1}(k) \,]^T \\ \quad = \sum_{t=0}^{N_{FFT}-1} s(t) \exp(-j 2\pi k t / N_{FFT}) \\ H(k) = \begin{bmatrix} H_{0,0}(k) & H_{0,1}(k) & \ldots & H_{0,U-1}(k) \\ H_{1,0}(k) & H_{1,1}(k) & \ldots & H_{1,U-1}(k) \\ \vdots & \vdots & \ddots & \vdots \\ H_{N_r-1,0}(k) & H_{N_r-1,1}(k) & \ldots & H_{N_r-1,U-1}(k) \end{bmatrix} \\ \quad = \sum_{t=0}^{N_{FFT}-1} h_t \exp(-j 2\pi k t / N_{FFT}) \\ \Pi(k) = [\, \Pi_0(k) \quad \Pi_1(k) \quad \ldots \quad \Pi_{N_r-1}(k) \,] \\ \quad = \sum_{t=0}^{N_{FFT}-1} \eta(t) \exp(-j 2\pi k t / N_{FFT}) \end{cases} \quad (4)$$

and $H_{n,u}$ (k) constituting a channel matrix H (k) ($N_r \times U$ matrix) of the k-th subcarrier is a channel between the u-th transmitter and the n-th receive antenna, $S_u$ (k) is a transmission spectrum of the k-th subcarrier of the u-th transmitter, and $\pi_n$ (k) is a noise component of the k-th subcarrier in the n-th receive antenna. The output of the FFT parts 34-1 to 34-Nr is input to a signal processing part.

In the channel estimation part 36, an estimated value (expressed by formula (5)) of the channel matrix H (k) between each transmitter and each receive antenna expressed by formula (4) is found and estimation of average noise power $\sigma^2$ in the receive antenna is made using the received reference signals in the number corresponding to the number of receive antennas and the results are output to a signal processing part 35.

[Mathematical formula 5]

$$\hat{H}(k) \quad (5)$$

Figure 4:
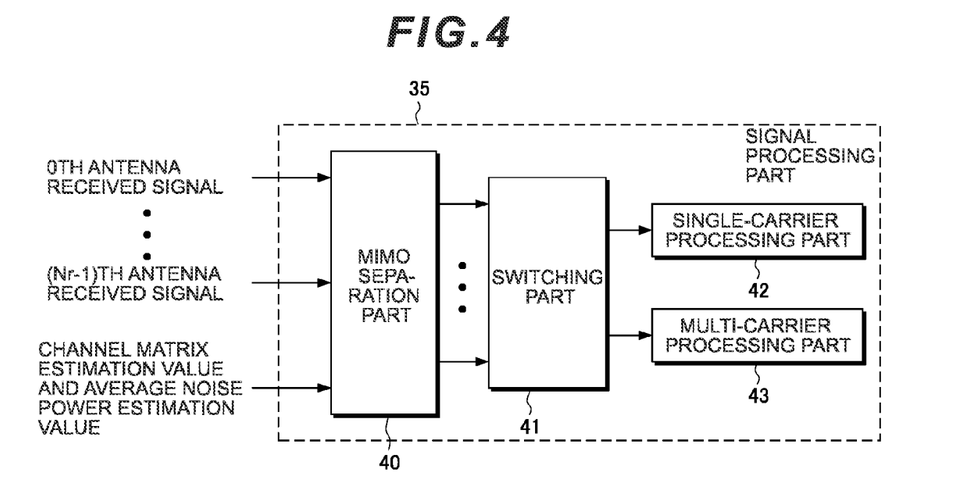
FIG. 4 is a diagram showing a schematic configuration of a signal processing part.

FIG. 4 is a diagram showing a schematic configuration of the signal processing part 35. In the signal processing part 35, input data signals of the frequency domain in the number corresponding to the number of receive antennas, the channel matrix estimation value, and the average noise power estimation value are input to a MIMO separation part 40. In the MIMO separation part 40, signal processing to separate data of each transmitter is performed using the channel matrix estimation value and the average noise power estimation value that are input and the frequency domain signals in the number corresponding to the separated U users (U transmitters) are output to a switching part 41. The schematic configuration of the MIMO separation part 40 will be described later.

In the switching part 41, whether the frequency domain signals in the number corresponding to the separated U users are a signal transmitted by a single-carrier transmission or a signal transmitted by an OFDM transmission is determined and the output destinations of the input signal are switched according to the determination result. That is, the switching part 41 outputs the input signal to one of a single-carrier processing part 42 and a multi-carrier processing part 43. For example, when a user u performs a single-carrier transmission, the frequency domain signal of the user u output from the MIMO separation part 40 is output to the single-carrier processing part 42 by the switching part 41. On the other hand, when the user u performs an OFDM transmission, the frequency domain signal of the user u output from the MIMO separation part 40 is output to the multi-carrier processing part 43 by the switching part 41.

Figure 5:
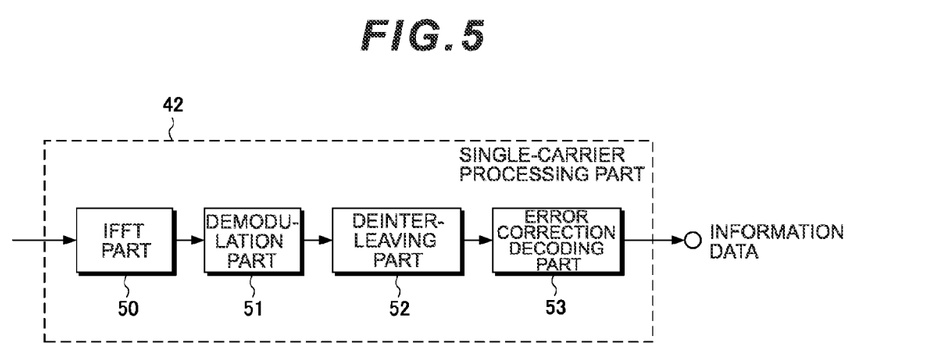
FIG. 5 is a diagram showing a schematic configuration of a single-carrier processing part.

FIG. 5 is a diagram showing a schematic configuration of the single-carrier processing part 42. As shown in FIG. 5, in the single-carrier processing part 42, the frequency domain signal of the separated u-th user is converted into a time domain by an IFFT part 50. Next, in a demodulation part 51, demodulation based on the modulation performed in the transmitter is performed. Further, in a deinterleaving part 52, processing to cancel the interleaving performed in the transmitter is performed and in an error correction decoding part 53, error correction decoding processing is performed. Due to this, the data the u-th user has transmitted is obtained.

Figure 6:
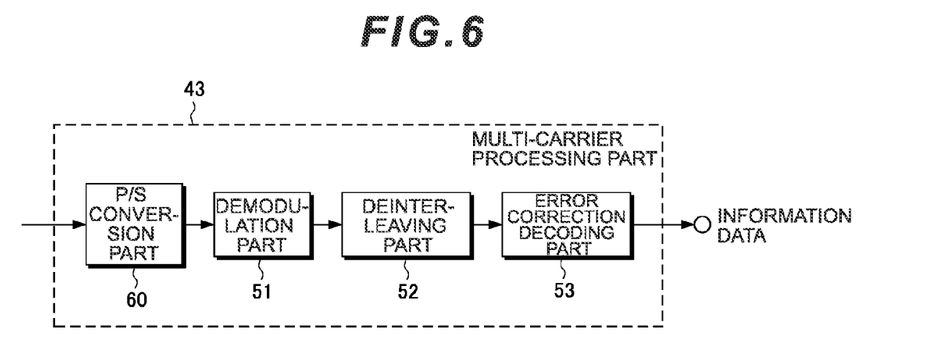
FIG. 6 is a diagram showing a schematic configuration of a multi-carrier processing part.

FIG. 6 is a diagram showing a schematic configuration of the multi-carrier processing part 43. The multi-carrier processing part 43 has the same configuration as that of the single-carrier processing part 42 shown in FIG. 5 except in that a P/S conversion part 60 is provided instead of the IFFT part 50.

Figure 7:
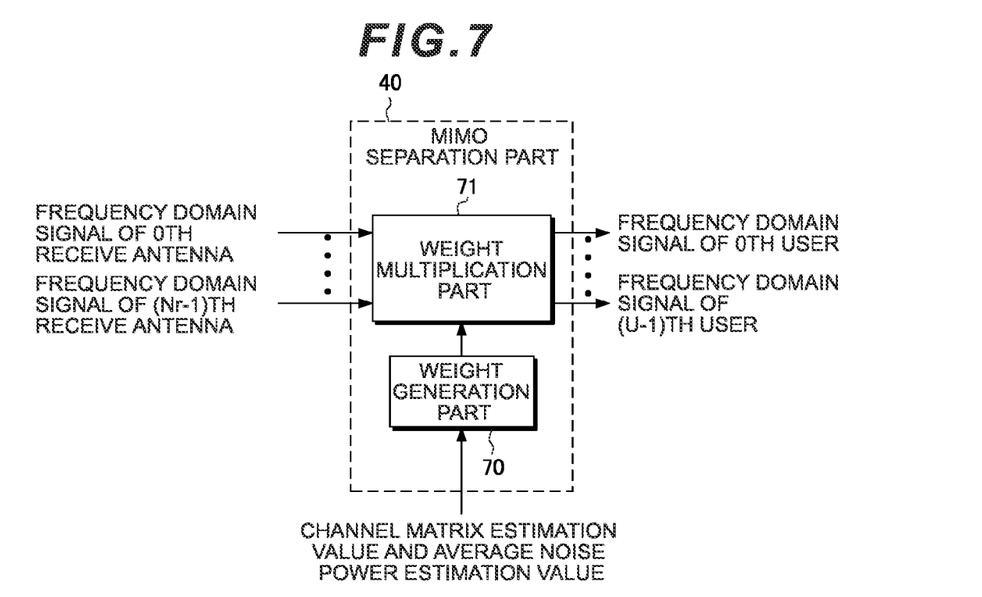
FIG. 7 is a diagram showing a schematic configuration of a MIMO separation part.

FIG. 7 is a diagram showing a schematic configuration of the MIMO separation part 40. The estimated value of the estimated value of the channel matrix (expressed by formula (5)) input from the channel estimation part 36 and the noise power estimation value $\sigma^2$ are input to a weight generation part 70. In the weight generation part 70, weights, such as an MMSE (Minimum Mean Square Error) weight and a ZF (Zero Forcing) weight, are calculated. For example, an MMSE weight matrix w (k) (U×$N_r$ matrix) is expressed by the following formula.

[Mathematical formula 6]

$$w(k)=\hat{H}^H(k)(\hat{H}(k)\hat{H}^H(k)+\sigma^2 I)^{-1} \quad (6)$$

Here, I is a unit matrix of $N_r \times N_r$ and $(.)^H$ represents an Hermitian-transposed adjoint matrix having been subjected to.

The obtained weight is input to a weight multiplication part 71. In the weight multiplication part 71, MIMO separation is performed by multiplying the weight matrix w (k) (U×$N_r$ matrix) and the vector R (k) ($N_r$×1 vector). The frequency domain signal vector (U×1 vector) of each user after separation is expressed by the following formula.

[Mathematical formula 7]

$$\tilde{R}(k)=w(k)R(k) \quad (7)$$

The weight multiplication part 71 outputs the frequency domain signal of each user after separation for U users. The MIMO separation part 40 in the first embodiment has a configuration in which MIMO separation is performed by multiplying the MMSE weights altogether regardless of the transmission scheme of each user when the single-carrier signal and the OFDM signal exist mixedly in the receive antenna.

Figure 8:
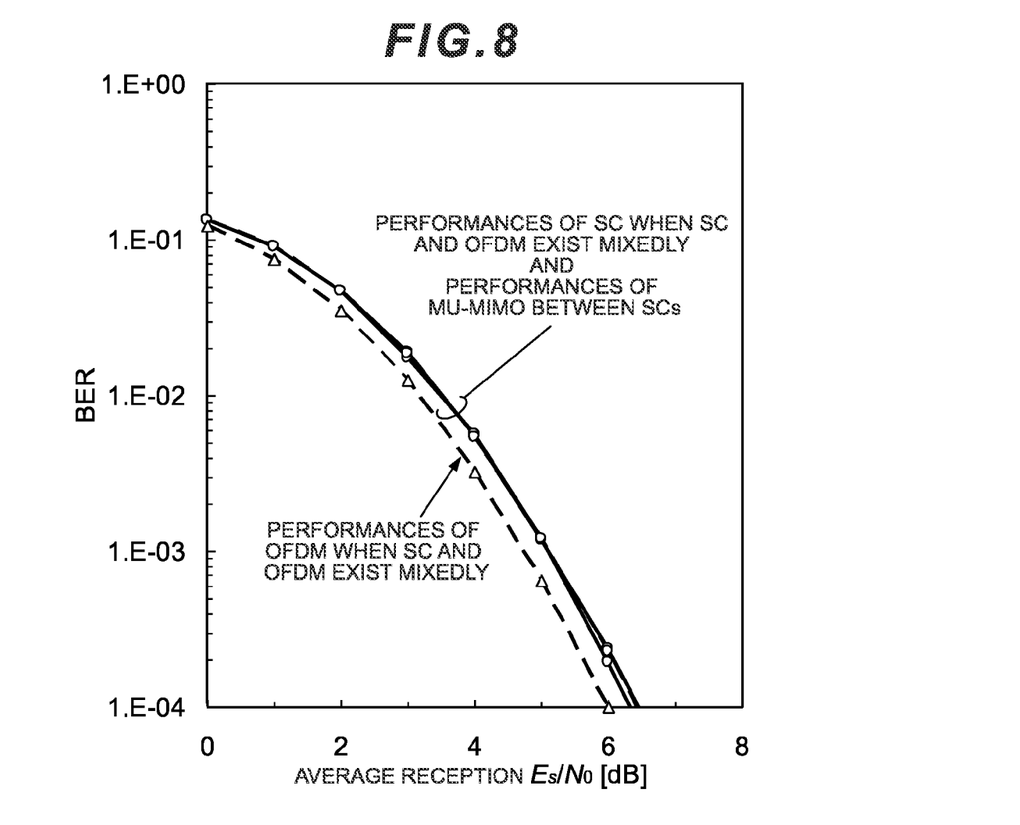
FIG. 8 is a graph showing a result of computer simulation of the transmission performances in a first embodiment.

FIG. 8 is a graph showing a result of computer simulation of the transmission performances in the first embodiment. In FIG. 8, the horizontal axis represents average received $E_s/N_0$ and the vertical axis represents BER (Bit Error Rate). Here, $E_s$ is energy per symbol and $N_0$ is a noise spectrum density. As shown in FIG. 8, the characteristics when MU-MIMO is performed between single-carriers (SC) agree with the characteristics of SC in MU-MIMO in which OFDM and SC exist mixedly. From this fact, it can be known that separation can be performed by multiplying the MMSE weights altogether regardless of the transmission scheme of each user.

In the first embodiment, as the MIMO separation method, space filtering in which a weight is multiplied for each antenna and antenna combining is performed is used, however, other separation methods, such as MLD (Maximum Likelihood Detection), may be used.

Conventionally, it is necessary for a transmitter to achieve multiuser MIMO by performing transmission in the same transmission scheme as that of another transmitter, however, according to the first embodiment, it is possible for each transmitter to determine the transmission scheme regardless of the transmission scheme of another transmitter. For example, even when a certain user performs single-carrier transmission, it is possible for another user to use multi-carrier transmission with high spectral efficiency at the same time and at the same frequency. Alternatively, even when a certain user performs multi-carrier transmission, it is possible for another user to use single-carrier transmission with less restriction on the allowable transmit power at the same time and at the same frequency. As described above, it is possible to dramatically increase the cell throughput by turning a multiuser MIMO system into a system in which the mixed existence of single-carrier transmissions and multi-carrier transmissions is allowed.

Second Embodiment

In the above-described first embodiment, the case where all of the spectra of respective users overlap is explained, however, in a second embodiment, a case is explained, where MIMO multiplexing is performed only in a certain partial spectrum. Further, in the second embodiment, explanation is given using Clustered DFT-S-OFDM as single-carrier transmission and OFDM that uses a discontinuous band as multi-carrier transmission, however, the present invention can be embodied also when other systems are used.

Figure 9:
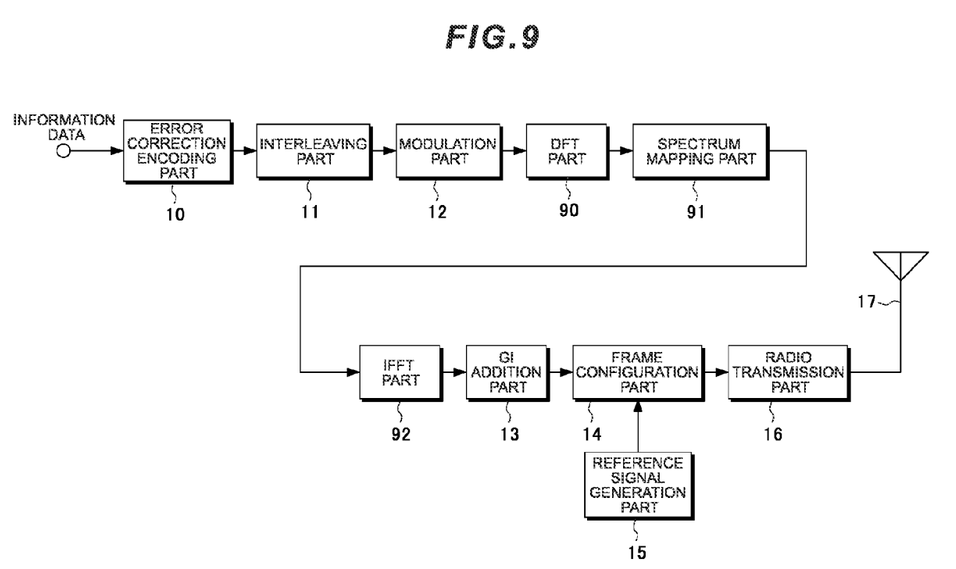
FIG. 9 is a diagram showing a schematic diagram of a transmitter that performs Clustered DFT-S-OFDM transmission.

FIG. 9 is a diagram showing a schematic configuration of a transmitter that performs Clustered DFT-S-OFDM transmission. The configuration differs from that of the transmitter that performs single-carrier transmission shown in FIG. 1 only in that a DFT part 90, a spectrum mapping part 91, and an IFFT part 92 are inserted between the modulation part 12 and the GI addition part 13.

The output of the modulation part 12 is input to the DFT part 90. The DFT part 90 applies $N_{DFT}$-point DFT to $N_{DFT}$ modulation symbols to convert them into frequency domain signals. The obtained $N_{DFT}$-point frequency spectra are output to the spectrum mapping part 91. The spectrum mapping part 91 divides the input $N_{DFT}$-point frequency spectra into clusters (cluster is a set of one or more spectra) and allocates each cluster to any of the $N_{FFT}$ frequency points. Allocation methods include various methods, such as one in which the cluster is allocated to an arbitrary frequency in an excellent channel state and a method in which the cluster is allocated to a frequency not used by any transmitter. The spectrum mapping part 91 inserts zero into a frequency to which no cluster is allocated and outputs it to the IFFT part 92.

The IFFT part 92 applies $N_{FFT}$-point IFFT to the frequency domain signals after the allocation obtained by the spectrum mapping part 91 and converts them into time domain signals of $N_{FFT}$ symbols. The output of the IFFT part 92 is input to the GI addition part 13. The subsequent processing is the same as that in the case of the first embodiment shown in FIG. 1.

Figure 10:
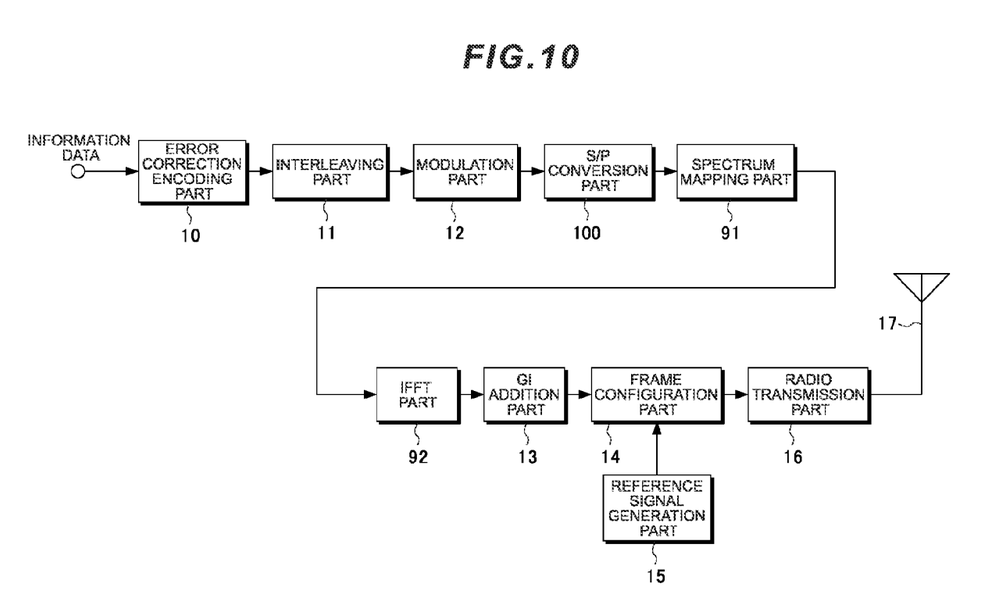
FIG. 10 is a diagram showing a configuration of a transmitter that performs OFDM transmission.

FIG. 10 is a diagram showing a configuration of a transmitter that performs OFDM transmission. The configuration of this transmitter differs from that of the transmitter that performs Clustered DFT-S-OFDM transmission shown in FIG. 9 only in that a S/P conversion part 100 is provided instead of the DFT part 90. The S/P conversion part 100 performs Serial-to-parallel conversion on a signal input from the modulation part 12 and outputs it to the spectrum mapping part 91. The subsequent processing is the same as that of the transmitter that performs Clustered DFT-S-OFDM transmission shown in FIG. 9.

Figure 11:
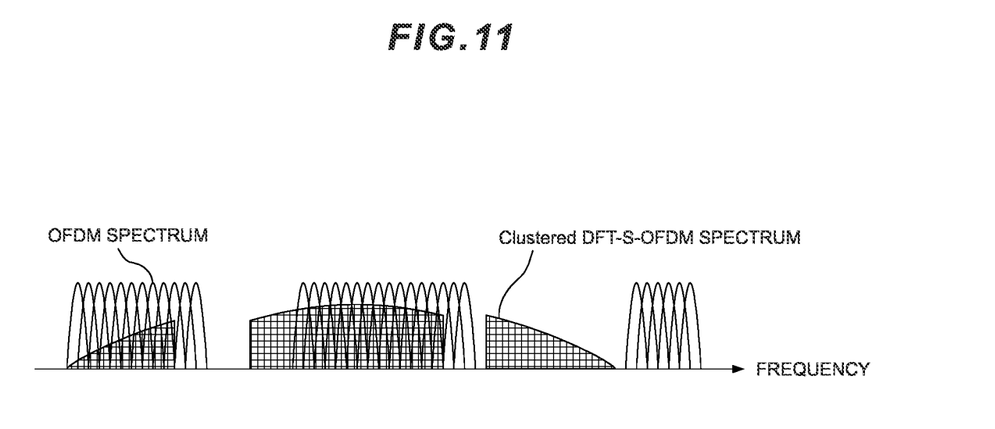
FIG. 11 is a diagram showing the way the spectra of Clustered DFT-S-OFDM and OFDM are multiplexed.

FIG. 11 is a diagram showing the way the spectra of Clustered DFT-S-OFDM and OFDM are multiplexed. In the second embodiment, as shown in FIG. 11, the spectra of Clustered DFT-S-OFDM and OFDM are multiplexed and received only in a partial frequency band in the receive antenna.

Figure 12:
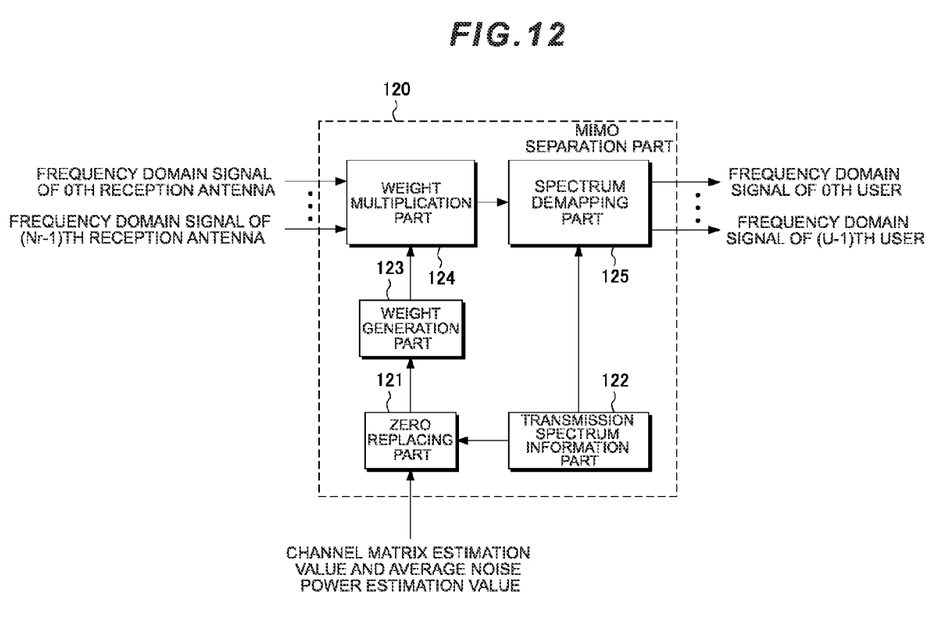
FIG. 12 is a diagram showing a configuration of a MIMO separation part according to a second embodiment.

The configuration of a receiver according to the second embodiment is explained. The processing from the reception of a signal to the inputting of the signal to the MIMO separation part is the same as that of the receiver according to the first embodiment shown in FIG. 3 to FIG. 7. FIG. 12 is a diagram showing the configuration of the MIMO separation part according to the second embodiment. In a MIMO separation part 120, the channel matrix estimation value and the average noise power estimation value input from the channel estimation part 36 are input to a zero replacing part 121. In the zero replacing part 121, based on information about the frequency used by each user notified from a transmission spectrum information part 122, the value of a channel in which no data transmission is performed among the elements of the channel matrix of each subcarrier expressed by formula (4) is set to zero and the channel matrix estimation value for which zero replacement is performed and the average noise power estimation value are output to a weight generation part 123. In the weight generation part 123, weights are calculated, such as the MMSE weight and the ZF weight. For example, the MMSE weight w (k) (U×N$_r$ matrix) is calculated based on formula (6).

The obtained weight is output to a weight multiplication part 124. In the weight multiplication part 124, the frequency domain received signal of each antenna is input to the weight multiplication part 124 and multiplied by the weight. As a result, the frequency domain signal separated for each user is obtained. The frequency domain signal of each user is input to a spectrum demapping part 125. In the spectrum demapping part 125, based on information about the frequency used by each user from the transmission spectrum information part 122, processing to extract the transmission spectrum of each user is performed. The spectrum demapping part 125 outputs the frequency domain signal of each user.

After that, the frequency domain signal of each user is input to the switching part 41 shown in FIG. 4 as in the first embodiment and is input to the single-carrier processing part 42 or the multi-carrier processing part 43 depending on whether the signal is transmitted by a single-carrier transmission or a multi-carrier transmission.

As described above, it is possible to perform more flexible frequency scheduling by allowing users who perform multiuser MIMO to multiplex partially instead of sharing all the bands in which transmission is performed. Further, in a frequency in which any user is not multiplexed or the number of multiplexed signals is smaller than the number of receive antennas, the receive antenna diversity effect can also be obtained, and therefore, it is possible to achieve excellent transmission performances. As a result of the above, it is possible to considerably improve the cell throughput.

The invention claimed is:

1. A multiuser MIMO (Multiple Input Multiple Output) system, the system comprising:
    a first terminal device;
    a second terminal device; and
    a base station device, wherein
    the first terminal device is configured to transmit a first transmission signal using a first set of subcarriers and a single-carrier transmission scheme;
    the second terminal device is configured to transmit a second transmission signal using a second set of subcarriers and a multi-carrier transmission scheme, where a plurality of subcarriers of the second set of subcarriers is overlapped with a plurality of subcarriers of the first set of subcarriers on a frequency domain; and
    the base station device configured to:
        receive transmission signals including at least the first transmission signal and the second transmission signal transmitted from the first terminal device and the second terminal device, and
        separate the first transmission signal and the second transmission signal from the received transmission signals.

2. A base station device applied to a multiuser MIMO system in which at least a first terminal device and a second terminal device perform transmission to at least the base station device, the base station device comprising:
    a reception part configured to receive transmission signals including a first transmission signal and a second transmission signal transmitted from at least the first terminal device and the second terminal device which the first terminal device transmits the first transmission signal using a first set of subcarriers and a single-carrier transmission scheme, and the second terminal device transmits the second transmission signal using a second set of subcarriers and a multi-carrier transmission scheme where a plurality of subcarriers of the second set of subcarriers is overlapped with a plurality of subcarriers of the first set of subcarriers on a frequency domain; and
    a MIMO separation part configured to separate the first transmission signal and the second transmission signal from the received transmission signals.

3. The base station device according to claim 2, wherein the MIMO separation part is configured to separate from the received transmission signals using an MMSE (Minimum Mean Square Error) weight for each signal received from the first terminal device and the second terminal device.

4. The base station device according to claim 2, wherein the MIMO separation part is configured to separate the first transmission signal and the second transmission signal from the received transmission signals using an MMSE (Minimum Mean Square Error) weight.

5. A terminal device that is applied to a multiuser MIMO system in which a plurality of terminal devices perform transmission to at least a base station device, the terminal device comprising:
    a transmission part configured to transmit a first transmission signal using a first set of subcarriers and a first transmission scheme which is one of a single-carrier transmission scheme and a multi-carrier transmission scheme, where a plurality of subcarriers of the first set of subcarriers is overlapped with a plurality of subcarriers of a second set of subcarriers on a frequency domain which the second set of subcarriers is used by another terminal device to transmit a second transmission signal using a second transmission scheme differs from the first transmission scheme.

6. The terminal device according to claim 5, wherein the first transmission scheme is determined according with a required transmission power.

7. The terminal device according to claim 5, wherein
the first transmission scheme is one of a transmission scheme to allocate subcarriers contiguously and a transmission scheme to allocate subcarriers discontiguously.

8. The terminal device according to claim 7, wherein
the transmission scheme to allocate subcarriers contiguously is DFT-S-OFDM transmission scheme and the transmission scheme to allocate subcarriers discontiguously is Clustered DFT-S-OFDM transmission scheme.

9. The terminal device according to claim 5, wherein
a first PAPR characteristic of the first transmission scheme differs from a second PAPR characteristic of the second transmission scheme.

10. A transmission method of a terminal device constituting a multiuser MIMO system with another terminal device, the transmission method comprising:
    transmitting a first transmission signal using a first set of subcarriers and a first transmission scheme which is one of a single-carrier transmission scheme and a multi-carrier transmission scheme, where a plurality of subcarriers of the first set of subcarriers is overlapped with a plurality of subcarriers of a second set of subcarriers on a frequency domain which the second set of subcarriers is used by another terminal device for transmitting a second transmission signal using a second transmission scheme differs from the first transmission scheme.

11. A reception method of a base station device applied to a multiuser MIMO system, the reception method comprising:
    receiving transmission signals including a first transmission signal and a second transmission signal transmitted from at least a first terminal device and a second terminal device which the first terminal device transmits the first transmission signal using a first set of subcarriers and a single-carrier transmission scheme, and the second terminal device transmits the second transmission signal using a second set of subcarriers and a multi-carrier transmission scheme where a plurality of subcarriers of the second set of subcarriers is overlapped with a plurality of subcarriers of the first set of subcarriers on a frequency domain; and
    separating the first transmission signal and the second transmission signal from the received transmission signals.

* * * * *